(12) United States Patent
Yamada (10) Patent No.: US 10,214,441 B2
(45) Date of Patent: Feb. 26, 2019

(54) CUTTING DEVICE

(71) Applicant: IHI Corporation, Tokyo (JP)

(72) Inventor: Junichi Yamada, Tokyo (JP)

(73) Assignee: IHI CORPORATION, Tokyo (JP)

( * ) Notice: Subject to any disclaimer, the term of this patent is extended or adjusted under 35 U.S.C. 154(b) by 724 days.

(21) Appl. No.: 14/682,902

(22) Filed: Apr. 9, 2015

(65) Prior Publication Data

US 2015/0209911 A1 Jul. 30, 2015

Related U.S. Application Data

(63) Continuation of application No. PCT/JP2013/077083, filed on Oct. 4, 2013.

(30) Foreign Application Priority Data

Oct. 12, 2012 (JP) ................. 2012-227023

(51) Int. Cl.
*B23K 26/30* (2014.01)
*C03B 33/03* (2006.01)
(Continued)

(52) U.S. Cl.
CPC .......... *C03B 33/03* (2013.01); *B23K 26/0846* (2013.01); *B23K 26/146* (2015.10);
(Continued)

(58) Field of Classification Search
CPC ............ B23K 2201/18; B23K 2203/50; B23K 26/0846; B23K 26/146; B23K 26/38;
(Continued)

(56) References Cited

U.S. PATENT DOCUMENTS 5,354,964 A * 10/1994 Kyoren ................ B23K 26/123
219/121.63
5,359,872 A * 11/1994 Nashiki .................... B21D 5/00
219/121.62

(Continued)

FOREIGN PATENT DOCUMENTS

CN 101024881 A 8/2007
JP 11-342483 A 12/1999

(Continued)

OTHER PUBLICATIONS

Koyama et al., WO 2007/037118, Apr. 5, 2007, English Translation.*

(Continued)

*Primary Examiner* — Dana Ross
*Assistant Examiner* — James Sims, III
(74) *Attorney, Agent, or Firm* — Rothwell, Figg, Ernst & Manbeck, P.C.

(57) ABSTRACT

Provided is a cutting device including a machining table configured to float a workpiece having a plate shape, a laser radiation unit configured to radiate a laser beam onto the workpiece, a coolant injection unit configured to inject a coolant onto the workpiece, and a moving device configured to relatively move the workpiece with respect to the laser radiation unit and the coolant injection unit in a preset direction. In the cutting device, a scattering member configured to receive injection of the coolant from the coolant injection unit and scatter the coolant is installed at the machining table in front of the workpiece in a moving direction in which the workpiece relatively moves.

8 Claims, 6 Drawing Sheets

(51) Int. Cl.
- B23K 26/38 (2014.01)
- B23K 26/08 (2014.01)
- C03B 33/033 (2006.01)
- C03B 33/09 (2006.01)
- B23K 26/70 (2014.01)
- B23K 26/146 (2014.01)
- B23K 26/40 (2014.01)
- B23K 101/18 (2006.01)
- B23K 103/00 (2006.01)

(52) U.S. Cl.
CPC .............. *B23K 26/38* (2013.01); *B23K 26/40* (2013.01); *B23K 26/703* (2015.10); *C03B 33/033* (2013.01); *C03B 33/091* (2013.01); B23K 2101/18 (2018.08); B23K 2103/50 (2018.08)

(58) Field of Classification Search
CPC ...... B23K 26/40; B23K 26/703; C03B 33/03; C03B 33/033; C03B 33/091; B25B 11/00; B25B 11/02
USPC ....... 219/121.67; 269/41, 43, 55, 71, 77, 84, 269/85, 91, 97, 291
See application file for complete search history.

(56) References Cited

U.S. PATENT DOCUMENTS

| | | |
|---|---|---|
| 2007/0169849 A1 | 7/2007 | Yahagi et al. |
| 2012/0017642 A1 | 1/2012 | Teranishi et al. |
| 2015/0246840 A1 | 9/2015 | Kawaguchi et al. |

FOREIGN PATENT DOCUMENTS

| | | |
|---|---|---|
| JP | 2007-191363 A | 8/2007 |
| JP | 2008-49375 A | 3/2008 |
| JP | 2010-167458 A | 8/2010 |
| JP | 2010-253752 A | 11/2010 |
| JP | 2012-25614 A | 2/2012 |
| JP | 2012-61681 A | 3/2012 |
| TW | 460422 B | 10/2001 |
| TW | 200704605 A | 2/2007 |
| TW | 200831227 A | 8/2008 |
| TW | 200845165 A | 11/2008 |
| TW | 201000244 A1 | 1/2010 |
| TW | 201114535 A1 | 5/2011 |
| TW | 201139025 A1 | 11/2011 |
| TW | 201208899 A1 | 3/2012 |
| WO | 2006/118809 A2 | 11/2006 |
| WO | 2007/037118 A1 | 4/2007 |
| WO | 2009/084276 A1 | 7/2009 |
| WO | 2009/084489 A1 | 7/2009 |
| WO | 2012/093987 A2 | 7/2012 |

OTHER PUBLICATIONS

International Search Report dated Dec. 24, 2013 in PCT/JP2013/077083 (4 pages).

Office Action dated Aug. 21, 2015 in corresponding Taiwan Patent Application No. 102136485 (with a partial English translation) (11 pages).

\* cited by examiner

CUTTING DEVICE

CROSS REFERENCE TO RELATED APPLICATIONS

This application is a continuation application based on a PCT Patent Application No. PCT/JP2013/077083, filed Oct. 4, 2013, whose priority is claimed on Japanese Patent Application No. 2012-227023, filed Oct. 12, 2012, the contents of both the PCT Application and the Japanese Application are incorporated herein by reference.

TECHNICAL FIELD

The present invention relates to a cutting device.

BACKGROUND ART

In the related art, as a cutting device for cutting a plate-shaped brittle material such as a glass plate or the like, a device including a laser radiation unit configured to radiate a laser beam to a workpiece such as a glass plate or the like to locally heat the workpiece, and a coolant injection unit configured to inject a coolant to the workpiece heated by the laser beam is disclosed (for example, see Patent Document 1).

In such a cutting device, when the coolant is injected to the workpiece, the coolant rebounds due to a force of injection and is scattered therearound. When the scattered coolant is scattered into a laser beam passage region through which the laser beam for heating the workpiece passes, the scattered coolant absorbs a part of the laser, and the workpiece cannot be sufficiently heated. With respect to such a problem, in Patent Document 1, as a shield plate is installed between a cooling area and a heating area, scattering of the coolant to the laser beam passage region is prevented.

CITATION LIST

Patent Document

[Patent Document 1] Japanese Unexamined Patent Application, First Publication No. 2008-49375

SUMMARY OF INVENTION

Technical Problem

Here, in such a cutting device, a margin of a heating condition irradiated with the laser beam is remarkably reduced by a material or a thickness of the workpiece. For this reason, when the workpiece having a small margin for the heating condition is machined as described above, in order to maintain a desired cutting precision, the heating condition should be strictly managed within a predetermined range. In particular, when high speed machining is performed, there is a need to increase the injection amount of the coolant, and so that the heating condition should be more strictly managed.

However, when a large amount of a coolant is needed, or the like, even if the shield plate is installed as disclosed in Patent Document 1, it is difficult to completely remove an influence of the coolant scattered into the laser beam passage region, and the heating condition cannot be easily managed within a predetermined range. In particular, when the workpiece is held on a machining table and the workpiece is continuously transported to a downward side of a laser radiation unit and continuously to a downward side of a coolant injection unit, it is extremely difficult to manage the heating condition by radiation of the laser beam within the predetermined range from an initial period machining time in which a front end side of the workpiece arrives at the downward side of the laser radiation unit and only heating treatment is performed by radiating the laser beam to the workpiece until after a middle period machining time in which the front end side of the workpiece arrives at the downward side of the coolant injection unit and the cooling by injection of the coolant and the heating by radiation of the laser beam are simultaneously performed in different regions of the workpiece. Accordingly, in the related art, since management of the heating condition cannot be appropriately managed, the cutting cannot be appropriately performed, and desired cutting precision cannot be obtained.

In consideration of the above-mentioned circumstances, the present invention is directed to provide a cutting device capable of managing a heating condition by radiation of a laser beam within a predetermined range, and thus obtaining desired cutting precision.

Technical Problem

The inventor(s) has diligently researched methods of accomplishing the above-mentioned objects, and as a result, learned that "an important cause for which management of the heating condition by radiation of the laser beam is extremely difficult from an initial period machining time in which a front end side of the workpiece arrives at the downward side of the laser radiation unit and only heating treatment is performed by radiating the laser beam to the workpiece until after a middle period machining time in which the front end side of the workpiece arrives at the downward side of the coolant injection unit and the cooling by injection of the coolant and the heating by radiation of the laser beam are simultaneously performed in different regions of the workpiece is that an influence of the coolant exerted on the laser beam passage region from the coolant injection unit varies largely from the initial period machining time until after the middle period machining time." The inventor(s) repeated further research based on the above-mentioned knowledge, and thus completed the present invention.

That is, a first aspect of the present invention is a cutting device including a machining table configured to float a workpiece having a plate shape, a laser radiation unit configured to radiate a laser beam onto the workpiece, a coolant injection unit configured to inject a coolant onto the workpiece; and a moving device configured to relatively move the workpiece with respect to the laser radiation unit and the coolant injection unit in a preset direction. The cutting device is configured to relatively move the workpiece in a direction preset by the moving device while radiating a laser beam from the laser radiation unit to a heating area set on the workpiece to heat the heating area, and inject the coolant from the coolant injection unit to a cooling area set on the heated heating area to cool the cooling area. In the cutting device, a scattering member configured to receive injection of the coolant from the coolant injection unit and scatter the coolant is installed at the machining table in front of the workpiece in a moving direction in which the workpiece relatively moves.

In addition, according to a second aspect of the present invention, in the cutting device of the first aspect, the machining table may include a plurality of floating plates arranged in parallel at an interval in a direction perpendicular to a direction in which the workpiece is relatively moved by the moving device, the moving device may include clamp members traveling in a lengthwise direction of the interval while sandwiching a front end section of the workpiece, and the scattering member may be disposed in the interval.

In addition, according to a third aspect of the present invention, in the cutting device of the second aspect, the plurality of clamp members may be installed, and the clamp members may sandwich the workpiece at different positions in a widthwise direction of the front end section of the workpiece.

A fourth aspect of the present invention is a cutting device, different from the cutting device of the first aspect, including, a machining table configured to place a workpiece having a plate shape, a laser radiation unit configured to radiate a laser beam onto the workpiece; a coolant injection unit configured to inject a coolant onto the workpiece, and a moving device configured to relatively move the machining table with respect to the laser radiation unit and the coolant injection unit in a preset direction. The cutting device is configured to relatively move the workpiece in a direction preset by the moving device by relatively moving the machining table in the preset direction while radiating a laser beam from the laser radiation unit to a heating area set on the workpiece to heat the heating area, and inject the coolant from the coolant injection unit to a cooling area set on the heated heating area to cool the cooling area. In the cutting device, a scattering member extending forward in a moving direction from a front end of the machining table in the moving direction in which the machining table is relatively moved and configured to receive injection of the coolant from the coolant injection unit to scatter the coolant is installed.

In addition, according to a fifth aspect of the present invention, in the cutting device of any one of the first to fourth aspects, a length of the scattering member in a direction in which the workpiece is relatively moved by the moving device may be larger than a distance between a front end in the relative moving direction of the cooling area and a rear end in the relative moving direction of the heating area.

In addition, according to a sixth aspect of the present invention, in the cutting device of any one of the first to fourth aspects, a shielding body disposed to provide a gap with the workpiece may be installed between a laser beam passage region in which the laser beam radiated from the laser radiation unit passes between the laser radiation unit and the heating area and a coolant passage region in which the coolant injected from the coolant injection unit passes between the coolant injection unit and the cooling area, and a gas injection unit configured to inject a gas from the laser beam passage region side toward the gap between the shielding body and the workpiece may be provided.

Advantageous Effects of Invention

According to the cutting device of the present invention, the scattering member configured to receive injection of the coolant from the coolant injection unit to scatter the coolant is installed in front of the workpiece in the moving direction in which the workpiece is relatively moved, or the scattering member extending forward in a moving direction from a front end of the machining table in the moving direction in which the machining table is relatively moved and configured to receive injection of the coolant from the coolant injection unit to scatter the coolant is installed. For this reason, even in the initial period machining time in which the front end section of the workpiece arrives at the downward side of the laser radiation unit and only the heating treatment by the laser beam radiation is performed on the workpiece, the coolant injected from the coolant injection unit is scattered by the scattering member.

Accordingly, in the middle period machining time in which the front end section of the workpiece arrives at the downward side of the coolant injection unit, and the cooling by the coolant injection and the heating by the laser beam radiation are simultaneously performed in different regions of the workpiece, the conditions become the same as when the coolant is scattered by the workpiece, and an influence of the coolant from the coolant injection unit to the laser beam passage region is substantially equalized from the initial period machining time until after the middle period machining time. Accordingly, the heating condition by the laser beam radiation can be substantially equalized from the initial period machining time until after the middle period machining time, i.e., can be managed within a predetermined range. Accordingly, desired cutting precision can be obtained.

DESCRIPTION OF EMBODIMENTS

First Embodiment

Hereinafter, a first embodiment of a cutting device of the present invention will be described in detail with reference to the accompanying drawings. Further, in the following drawings, in order to enlarge components to a recognizable size, a scale of each of the components is appropriately varied.

Figure 1A:
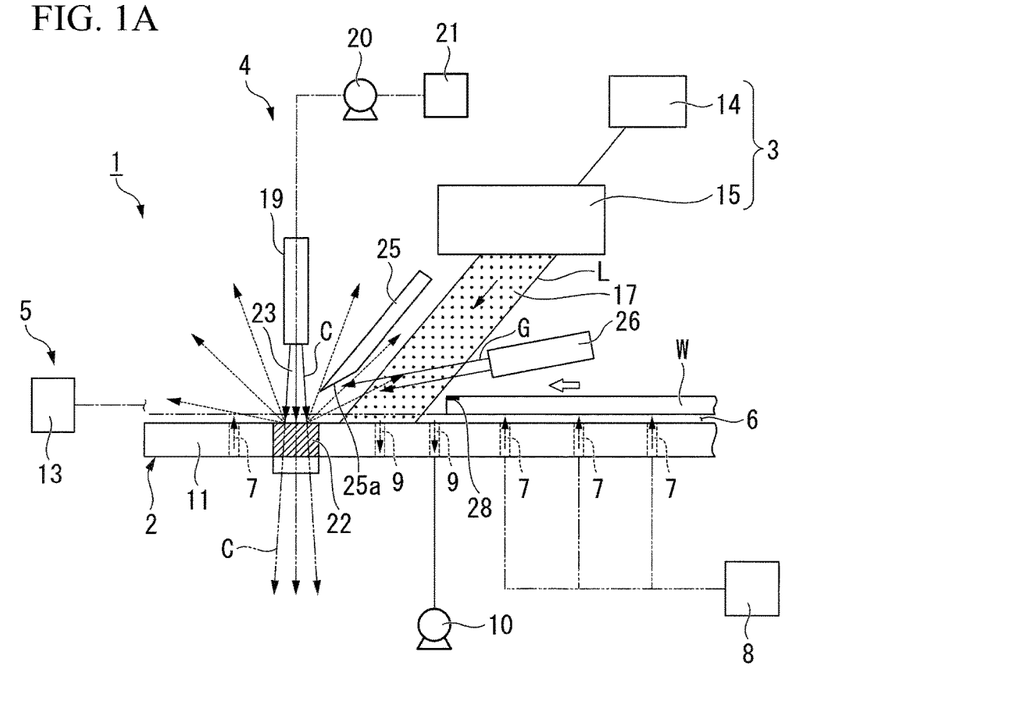
FIG. 1A is a side view showing a schematic configuration of a first embodiment of a cutting device of the present invention.
Figure 1B:
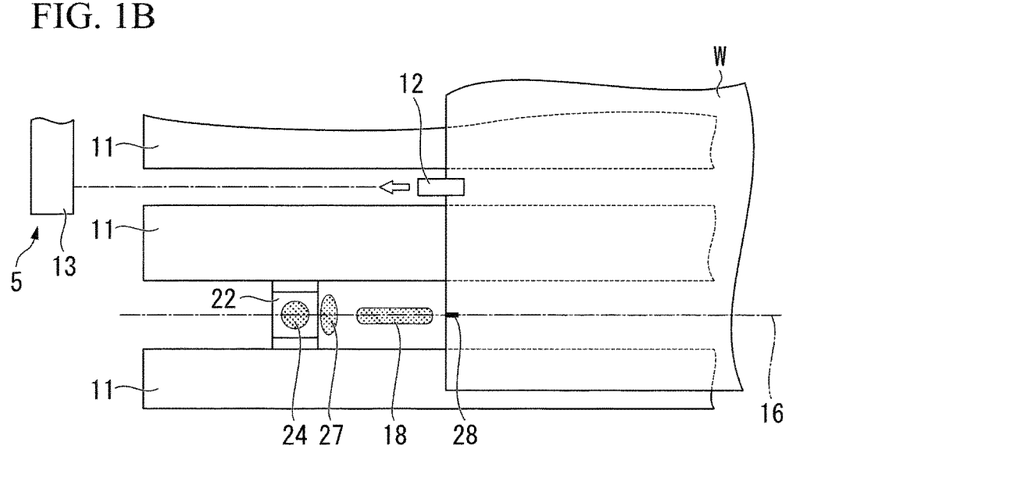
FIG. 1B is a plan view showing the schematic configuration of the first embodiment of the cutting device of the present invention.

FIGS. 1A and 1B show a schematic configuration of the first embodiment of the cutting device of the present invention, wherein FIG. 1A is a side view, and FIG. 1B is a plan view.

Reference numeral 1 of FIGS. 1A and 1B designates a cutting device. The cutting device 1 includes a machining table 2 configured to dispose a workpiece W having a plate shape, a laser radiation unit 3 configured to radiate a laser beam to the workpiece W, a coolant injection unit 4 configured to inject a coolant to the workpiece W, and a moving device 5 configured to relatively move the workpiece W.

The workpiece W is formed of a brittle plate member such as a glass plate or the like, and the workpiece W of the embodiment is formed of a glass plate. While the glass plate is not particularly limited, the glass plate is an extremely thin rectangular plate member having a thickness of 1 mm or less (for example, about 0.1 mm to 0.7 mm). The cutting device 1 of the embodiment forms a cutting line on the glass plate (the workpiece W) in a long side direction or a short side direction of the glass plate. The glass plate (the workpiece W) can be cut along the cutting line.

As shown in FIG. 1A, the machining table 2 floats the workpiece W having the plate shape disposed on the upper surface from the upper surface, and holds the workpiece W via an air layer 6. A number of air holes 7 are formed in the machining table 2, and a blower 8 is connected to the air holes 7 via a pipeline (not shown). As air is blown from the blower 8, the air is uniformly jetted from the air holes 7 and the workpiece W floats upward from the upper surface of the machining table 2. That is, the air layer 6 is formed on the upper surface of the machining table 2 by the air jetted from the air holes 7, and the state in which the workpiece W is floated is maintained by the air layer 6. Further, shapes of the air holes 7 are not particularly limited, but slit-shaped long and narrow holes or the like may be provided in addition to general circular holes.

In addition, a number of suction holes 9 are also formed in a machining region, in which heating is performed by the laser radiation unit 3 or cooling is performed by the coolant injection unit 4 (which will be described below), or a region adjacent thereto, separately from the air holes 7. A vacuum pump 10 serving as a negative pressure source is connected to the suction holes 9 via a pipeline (not shown). As the workpiece W is suctioned by the vacuum pump 10, the workpiece W is pulled toward the suction holes 9. However, a suction force by the suction holes 9 is set to be smaller than a force by which the air holes 7 float the workpiece W. Accordingly, by balancing discharge of the air from the air holes 7 and suction by the suction holes 9, a gap (a layer thickness of the air layer 6) between the workpiece W and the upper surface of the machining table 2 is maintained at a constant preset interval. Accordingly, the workpiece W is held with high precision with respect to the machining table 2.

In addition, as shown in FIG. 1B, the machining table 2 includes a plurality of floating plates 11 arranged in parallel in a direction perpendicular to a direction in which the workpiece W moves. The plurality of air holes 7 (see FIG. 1A) are formed in these floating plates 11 as described above, and the suction holes 9 (see FIG. 1A) are also formed in the machining region along with the air holes 7. These floating plates 11 are disposed at intervals, and clamp members 12 that constitute the moving device 5 are disposed within the intervals.

The moving device 5 includes a driving unit 13 having a driving source such as a motor or the like disposed in front of the machining table 2, and the clamp members 12 connected to the driving unit 13 via a connecting member (not shown), and moves the workpiece W with respect to the fixed machining table 2 in an arrow direction (forward) of FIG. 1B. The moving device 5 includes the plurality of (in the embodiment, two) clamp members 12, and these clamp members 12 and 12 sandwich both sides sections in a widthwise direction of a side of the workpiece W near a front end section of the workpiece W. The above-mentioned moving device 5 pulls the clamp members 12 and 12 in the arrow direction (forward) of FIG. 1B by driving of the driving unit 13, and moves the clamp members 12 and 12 in the interval between the floating plates 11 and 11. That is, as the clamp members 12 and 12 move, the workpiece W is straightly moved with respect to the machining table 2 toward the driving unit 13 at a predetermined speed (for example, 1 m/s).

Further, the number of clamp members 12 is not limited to 2 but may be appropriately varied according to a dimension of the workpiece W. For example, when a length of the side (a width of the side) of the front end section of the workpiece W is small, there may be only one clamp member 12, or when the length of the side (the width of the side) of the front end section is large, the number of clamp members 12 may be three or more.

As shown in FIG. 1A, the laser radiation unit 3 is disposed over the machining table 2. The laser radiation unit 3 is disposed at a position over the moving workpiece W (a position over the workpiece W disposed on the machining table 2), and includes a laser oscillator 14, and an optical system 15 configured to guide a laser beam L oscillated from the laser oscillator 14.

For example, a carbonic acid gas laser oscillator having an output of 100 W to hundreds of W is appropriately used as the laser oscillator 14. However, a laser oscillator according to another output range or another oscillating mechanism can also be used. The optical system 15 is formed of a mirror, a lens, or the like, and guides and collects the laser beam L oscillated from the laser oscillator 14 to a preset region (heating area).

That is, the laser radiation unit 3 is configured to radiate the laser beam L with respect to the workpiece W moving on the machining table 2 onto a projected cutting line 16 shown in FIG. 1B from an inclined upward side, and locally heat the workpiece W. Here, as shown in FIG. 1A, a space through which the laser beam L passes between the laser radiation unit 3 and the workpiece W (or the machining table 2) is set as a laser beam passage region 17, and as shown in FIG. 1B, a region on the workpiece W (or the machining table 2) in which the laser beam L is radiated is set as a heating area 18. In the embodiment, the heating area 18 is a substantially rectangular region formed in a long and thin shape along the projected cutting line 16. That is, in the laser radiation unit 3, the laser oscillator 14 or the optical system 15 is configured to form the heating area 18 having a substantially long and thin rectangular shape.

In addition, as shown in FIG. 1A, the coolant injection unit 4 is disposed over the machining table 2 at a position of a forward side in a moving direction of the workpiece W far from the laser radiation unit 3 (a position close to the driving unit 13) and spaced a predetermined distance from the laser radiation unit 3. The coolant injection unit 4 includes an injection nozzle 19 disposed to extend toward the machining table 2 at a downward side in the vertical direction, a liquid feeding pump 20, and a tank 21 configured to store a coolant. The coolant injection unit 4 injects a coolant C having fluidity from the injection nozzle 19 toward a scattering member 22 of the machining table 2 (to be described below) or the workpiece W moving on the machining table 2.

Here, a space between the coolant injection unit 4 and the workpiece W (or the scattering member 22) through which the coolant C passes is set as a coolant passage region 23, and as shown in FIG. 1B, a region on the scattering member 22 (or the workpiece W) in which the coolant C is injected is set as a cooling area 24. In the embodiment, the cooling area 24 is formed on the scattering member 22 disposed on the projected cutting line 16. That is, the cooling area 24 is set as a small circular region, formed at a forward side in the moving direction of the workpiece W, and spaced a predetermined distance from the heating area 18.

The coolant C injected from the injection nozzle 19 is provided to abruptly cool the heating area 18 formed at the workpiece W by the laser radiation unit 3, and formed by mixing a gas such as air or the like with water.

The scattering member 22 is a member formed of a metal or the like in a block shape or a plate shape having a rectangular upper surface disposed on the projected cutting line 16 of the workpiece W as described above, and an upper surface of the scattering member 22 is disposed to be flush with the upper surface of the machining table 2 (the floating plate 11). As the above-mentioned scattering member 22 is disposed immediately under the injection nozzle 19 of the coolant injection unit 4, the scattering member 22 forms the region (the cooling area 24) in which the coolant C is injected on the upper surface of the scattering member 22 or over the upper surface of the scattering member 22 via the injection nozzle 19. That is, when the upper surface of the scattering member 22 is not covered with the workpiece W, as the coolant C is directly injected to the upper surface of the scattering member 22, the cooling area 24 is formed on the upper surface of the scattering member 22. In addition, when the upper surface of the scattering member 22 is covered with the workpiece W according to movement of the workpiece W, as the coolant C is directly injected to the upper surface of the workpiece W, the cooling area 24 is formed at a position immediately over the scattering member 22 in the upper surface of the workpiece W.

In addition, in the embodiment, as shown in FIG. 1A, a baffle (a shielding body) 25 is disposed between the laser beam passage region 17 and the coolant passage region 23. The baffle 25 is formed of a plate member having a flat plate shape, and disposed to be inclined along the laser beam passage region 17. In addition, a lower end surface 25a of the baffle 25 is an inclined surface cut to be inclined to be opposite to the upper surface of the workpiece W on the machining table 2 or the upper surface of the machining table 2, and the inclined surface (the lower end surface 25a) is disposed to provide a slight gap with the upper surface of the workpiece W. The above-mentioned baffle 25 blocks a space between the laser beam passage region 17 and the coolant passage region 23 without interfering with movement of the workpiece W. Further, an adjustment unit (not shown) configured to adjust a position or an inclination angle of the baffle 25 is installed at the baffle 25.

Further, in the embodiment, a gas injection nozzle 26 configured to inject air (gas) toward a gap between the lower end surface 25a of the baffle 25 and the upper surface of the workpiece W is installed. The gas injection nozzle 26 is disposed at an opposite side of the baffle 25 with respect to the laser beam passage region 17, i.e., the outside of the laser beam passage region 17, and connected to an air feeding pump (not shown) to inject a gas such as air or the like sent from the air feeding pump. As shown in FIG. 1B, the above-mentioned gas injection nozzle 26 forms a gas injection area 27 having an oval shape between the heating area 18 and the cooling area 24 on the machining table 2 or the workpiece W. Further, an adjustment unit (not shown) configured to adjust a position or an inclination angle of the gas injection nozzle 26 is also installed at the gas injection nozzle 26.

When the workpiece W is cut by the above-mentioned cutting device 1, initially, in the machining table 2, the air is jetted from the air holes 7, and in the machining region or the region adjacent thereto, the air is suctioned through the suction holes 9. Next, the workpiece W is disposed at a predetermined position on the machining table 2 by a conveyance apparatus (not shown). Accordingly, the workpiece W is floated over the machining table 2 by the air jetted from the air holes 7 without coming in contact with the upper surface of the machining table 2, and held at a predetermined position over the machining table 2 via the air layer 6. Then, in this state, the clamp members 12 and 12 of the moving device 5 are disposed at a front end section of the workpiece W, and the front end section of the workpiece W is sandwiched by the clamp members 12 and 12.

Further, when the workpiece W is disposed over the machining table 2 as described above and shown in FIGS. 1A and 1B, the workpiece W is disposed further toward a rear side in the moving direction of the workpiece W than the heating area 18, the gas injection area 27 and the cooling area 24. Accordingly, the workpiece W is disposed at a position at which the workpiece W does not overlap the heating area 18, the gas injection area 27 and the cooling area 24.

Next, an initial crack 28 serving as a cutting start position is formed at a surface of the front end section of the workpiece W by using a diamond cutter (not shown) or the like. Further, formation of the initial crack 28 is previously performed by using a separate apparatus before setting the workpiece W over the machining table 2, and then the workpiece W having the initial crack 28 may be set over the machining table 2.

Next, as shown in FIGS. 1A and 1B, in a state in which the workpiece W is held over the machining table 2 without movement, the laser radiation unit 3, the coolant injection unit 4 and the gas injection nozzle 26 are respectively operated in a pre-process. That is, as shown in FIG. 1A, the laser beam L is radiated from the laser radiation unit 3, the coolant C is injected from the coolant injection unit 4, and the air (gas) G is injected from the gas injection nozzle 26. Accordingly, the coolant C injected from the coolant injection unit 4 is strongly injected toward the scattering member 22 that forms the cooling area 24 as described above, and collides with the scattering member 22 in the cooling area 24. As a result, the coolant C rebounds from the scattering member 22 and becomes a spray or mist to be scattered. Further, "spray" refers to droplets having a scattering property, and "mist" refers to matter including fog and droplets resembling fog, and having a property of floating in the air.

In addition, the laser radiation unit 3 performs heating with respect to the heating area 18 by radiation of the laser beam L, and the gas injection nozzle 26 performs injection of the air G to a downward side of the baffle 25. Here, some of the spray or mist of the coolant C scattered from the scattering member 22 passes through a lower side of the baffle 25 to be scattered into the laser beam passage region 17. Accordingly, intensity of heating by the laser radiation unit 3 (intensity of heating by radiation of the laser beam L) is slightly reduced in comparison with the case in which no spray or mist of the coolant C is scattered.

Specifically, when there is no scattering member 22, the coolant C injected from the injection nozzle 19 is pulled through an interval between the floating plates 11 and 11 that constitute the machining table 2 as shown by two-dotted chain lines of FIG. 1A, and arrives at the downward side of the machining table 2. As a result, the coolant C does not rebound at an upward side of the machining table 2, and the spray or mist of the coolant C does not pass through the lower side of the baffle 25 or is not scattered into the laser beam passage region 17 either. For this reason, the intensity of heating by the laser radiation unit 3 (the intensity of heating by radiation of the laser beam L) becomes intensity according to the preset condition without a decrease in intensity.

Figure 2A:
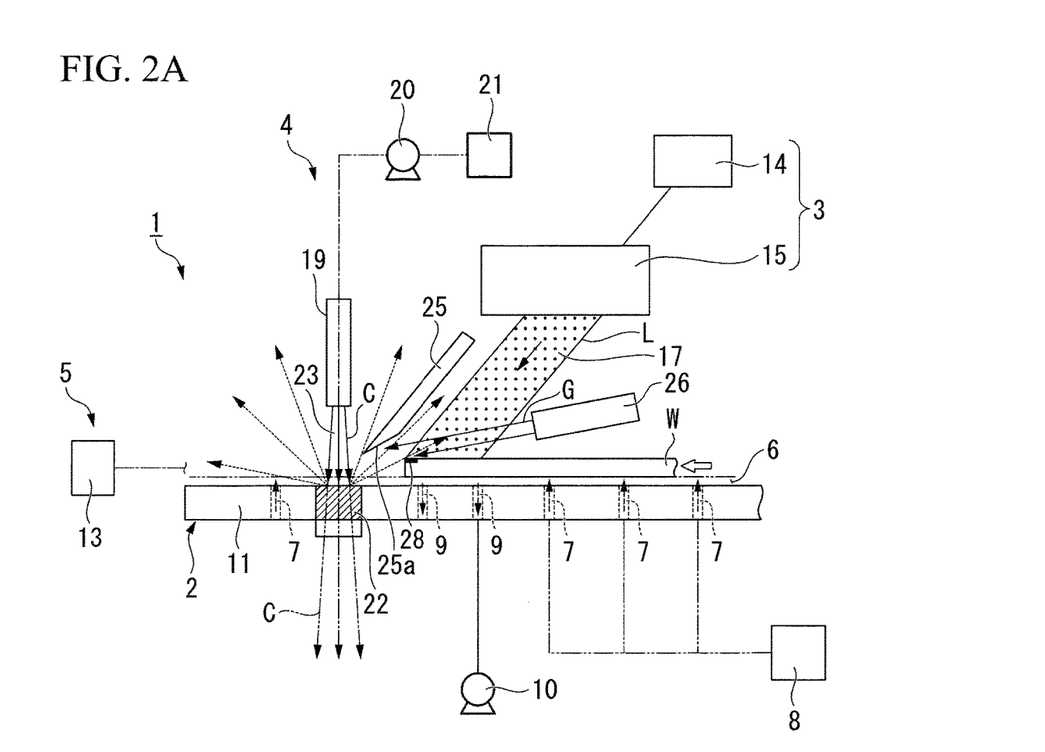
FIG. 2A is a side view showing a state of an initial period machining time of the cutting device shown in FIGS. 1A and 1B.
Figure 2B:
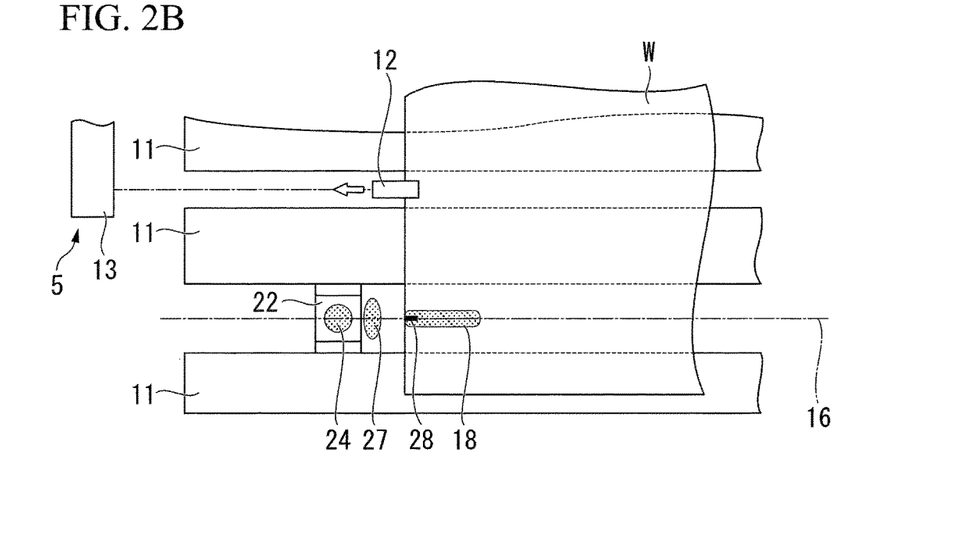
FIG. 2B is a plan view showing the state of the initial period machining time of the cutting device shown in FIGS. 1A and 1B.

After the above-mentioned pre-process, in a machining process (scribing process), as shown in FIGS. 2A and 2B, the workpiece W is moved (advanced) by the moving device 5 and the front end section having the initial crack 28 arrives at the downward side of the laser beam passage region 17 while the laser radiation unit 3, the coolant injection unit 4 and the gas injection nozzle 26 are operated. Accordingly, the heating area 18 is formed on the workpiece W, and the front end section of the workpiece W is irradiated with the laser beam L to be heat-treated. Here, since the front end section of the workpiece W does not arrive at the coolant passage region 23, the workpiece W passes through initial period machining in which only heating treatment is performed without cooling treatment.

In the above-mentioned initial period machining time, although the cooling treatment is not performed on the workpiece W, since the coolant injection unit 4 holds continuity and uniformity of the machining conditions, injection of the coolant C is performed as described above. Accordingly, in the embodiment, as described above, as the coolant C rebounds from the scattering member 22 and some of the spray or mist is scattered into the laser beam passage region 17, intensity of heating by radiation of the laser beam L is slightly reduced.

Meanwhile, when there is no scattering member 22, as described above, such a decrease in heating intensity does not occur.

Figure 3A:
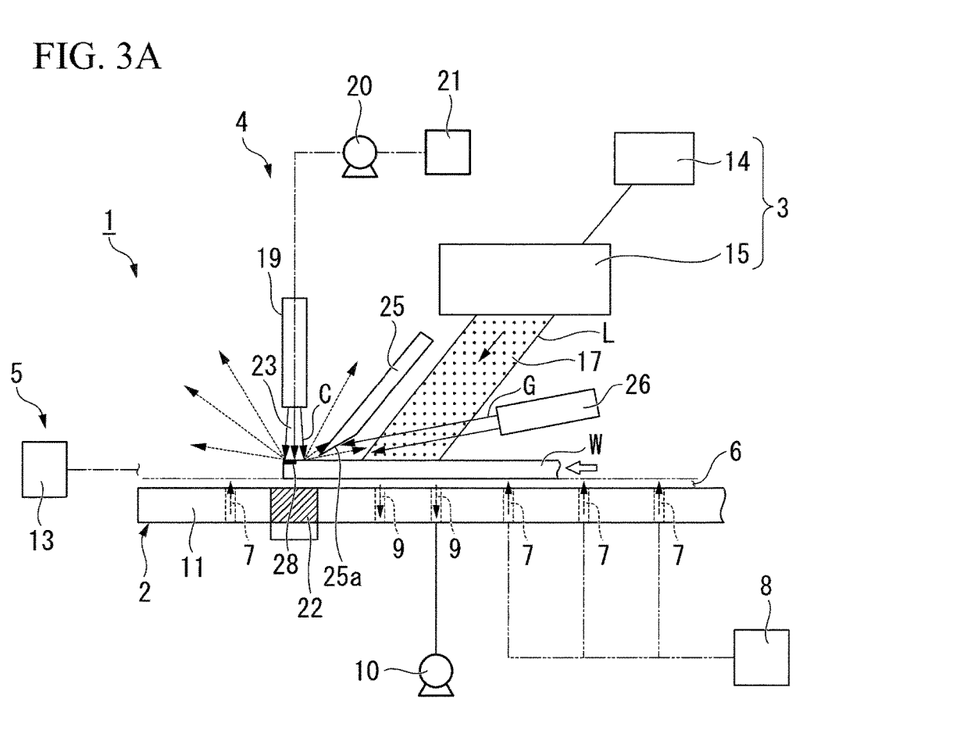
FIG. 3A is a side view showing a state of a middle period machining time of the cutting device shown in FIGS. 1A and 1B.
Figure 3B:
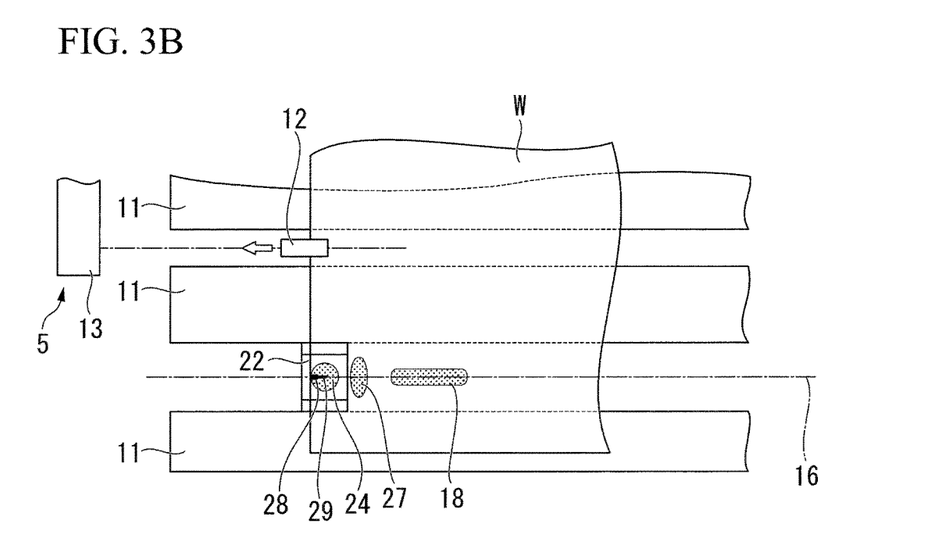
FIG. 3B is a plan view showing the state of the middle period machining time of the cutting device shown in FIGS. 1A and 1B.

Next, in middle period machining continuing from the initial period machining, in a state in which the laser radiation unit 3, the coolant injection unit 4 and the gas injection nozzle 26 are each operated, as shown in FIGS. 3A and 3B, the workpiece W is continuously moved (advanced) by the moving device 5, the front end section of the workpiece W having the initial crack 28 arrives at the downward side of the coolant passage region 23, and a portion of the workpiece W slightly closer to the rear end than the front end section arrives at the downward side of the laser beam passage region 17. Further, for convenience, while the above-referenced machining are represented as the initial period machining and the middle period machining, during transition from the initial period machining to the middle period machining, the workpiece W is moved at a constant speed by the moving device 5 without stoppage. Accordingly, the heating area 18 heated by radiation of the laser beam L or the cooling area 24 cooled by the coolant C continuously moves (varies) at a constant speed on the workpiece W. That is, the heating area 18 or the cooling area 24 continuously moves (varies) at a constant speed in a direction opposite to the moving direction of the workpiece W.

Figure 3C:
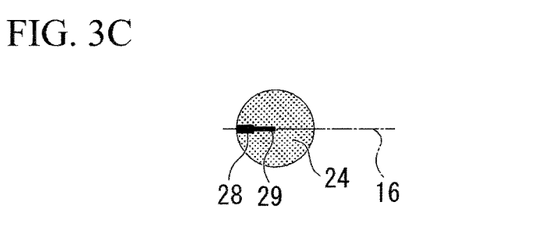
FIG. 3C is a partially enlarged view showing the state of the middle period machining time of the cutting device shown in FIGS. 1A and 1B.

When the coolant C is injected to cool the front end section of the workpiece W in this way, the previously heated area is rapidly cooled. Accordingly, tensile stress is generated at a surface (an upper surface) of the workpiece W in the heating/cooling operation, and stress concentration is generated at a notch root of the initial crack 28. For this reason, when the predetermined stress is applied, as shown in FIGS. 3B and 3C, a cutting line 29 advances along the projected cutting line 16 with the initial crack 28 serving as a starting point. Accordingly, by controlling the direction in which the crack advances, the cutting line 29 having one stripe shape (groove shape) is ultimately formed on the projected cutting line 16 of the workpiece W. That is, by continuously moving the workpiece W at a constant speed while operating each of the laser radiation unit 3, the coolant injection unit 4 and the gas injection nozzle 26, the cutting line 29 is formed in the moving direction of the workpiece W.

Further, in the above-mentioned machining, since the baffle 25 is installed and the air (gas) G is injected from the gas injection nozzle 26 toward the gap between the baffle 25 and the workpiece W, the scattering of the coolant C injected from the coolant injection unit 4 to the laser beam passage region 17 can be suppressed to a minimum level. However, the scattering of the coolant C to the laser beam passage region 17 cannot be completely removed. That is, even when there is a slight amount of scattering, in the laser radiation unit 3, intensity of heating by radiation of the laser beam L is affected by the scattering of the coolant C to be decreased as described above.

When such machining (scribing process) is terminated, as bending machining is performed on the cutting line 29 of the workpiece W by a bending machine (not shown), the workpiece W is cut using the cutting line 29 as a boundary. In addition, when a plate thickness of the workpiece W is extremely small (for example, when the plate thickness is about 0.1 mm), a condition in which the cutting can be performed at a cooled point (a condition in which full cutting can be performed) can be made without performing the bending machining.

In the cutting device 1 of the embodiment, the scattering member 22 configured to receive the injection of the coolant C from the coolant injection unit 4 and scatter the coolant C is installed at a forward side of the workpiece W in the moving direction in which the workpiece W moves on the machining table 2. For this reason, as shown in FIGS. 2A and 2B, even in the initial period machining time in which the front end section of the workpiece W arrives at the downward side of the laser radiation unit 3 and only the heating treatment by the laser beam radiation is performed on the workpiece W, the coolant C injected from the coolant injection unit 4 rebounds from (is scattered by) the scattering member 22 and is scattered into the laser beam passage region 17.

Accordingly, as shown in FIGS. 3A and 3B, in and after the middle period machining time in which the cooling by the coolant injection and the heating by the laser beam radiation are simultaneously performed in different regions as the front end side of the workpiece W arrives at the downward side of the coolant injection unit 4, the coolant C is in substantially the same condition as when the coolant C is scattered by the workpiece W in the initial period machining time.

That is, in the initial period machining time shown in FIG. 2A and in and after the middle period machining time shown in FIG. 3A, the coolant C is scattered to the entire laser beam passage region 17. For this reason, an influence applied to the laser beam passage region 17 by the coolant C is substantially the same as in the initial period machining time and in and after the middle period machining time.

Accordingly, the heating condition by the laser beam radiation can be substantially equally (within a predetermined range) managed from the initial period machining time until after the middle period machining time. Accordingly, desired cutting precision can be obtained.

Meanwhile, when the scattering member 22 is not installed, during the initial period machining time shown in FIG. 2A, the coolant C passes through a space between the floating plates 11 and 11 to arrive at the downward side of the machining table 2 as shown by two-dotted lines of FIG. 2A. As a result, the coolant C does not rebound at the upper side of the machining table 2, and the spray or mist of the coolant C is not scattered to the laser beam passage region 17. For this reason, intensity of heating by the laser radiation unit 3 (intensity of heating by radiation of the laser beam L) increases to be larger than in and after the middle period machining time shown in FIG. 3A. That is, since the heating condition (heating intensity) by the laser beam radiation varies between the initial period machining time and in and after the middle period machining time, the heating condition (heating intensity) cannot be managed within a predetermined range. Accordingly, desired cutting precision cannot be obtained.

In addition, in the embodiment, as the machining table 2 over which the workpiece W is held, a floating type that holds the workpiece W via the air layer 6 is used. For this reason, the workpiece W does not come in direct contact with the upper surface of the machining table 2, and sticking of contaminants (foreign substances) or formation of scratches due to contact or the like with the upper surface can be prevented.

In addition, in the embodiment, as shown in FIG. 1B, an interval between the floating plates 11 and 11 used for traveling of the clamp member 12 and an interval between the floating plates 11 and 11 used for disposition of the scattering member 22 are separately provided. For this reason, it is possible to prevent the scattering member 22 from interfering with the traveling of the clamp member 12, and the workpiece W can be appropriately moved.

Second Embodiment

Figure 4A:
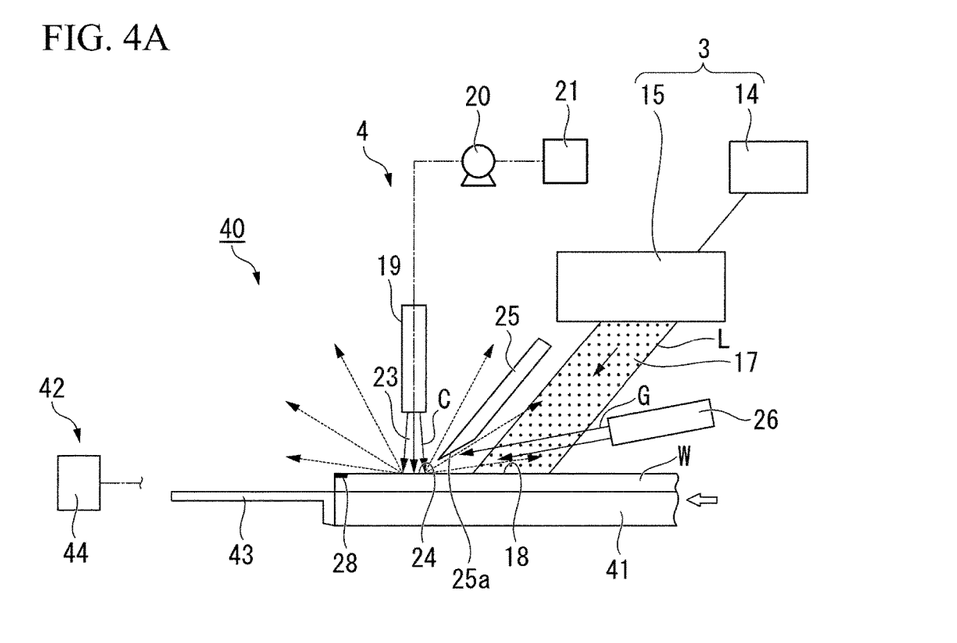
FIG. 4A is a side view showing a schematic configuration of a second embodiment of the cutting device of the present invention.
Figure 4B:
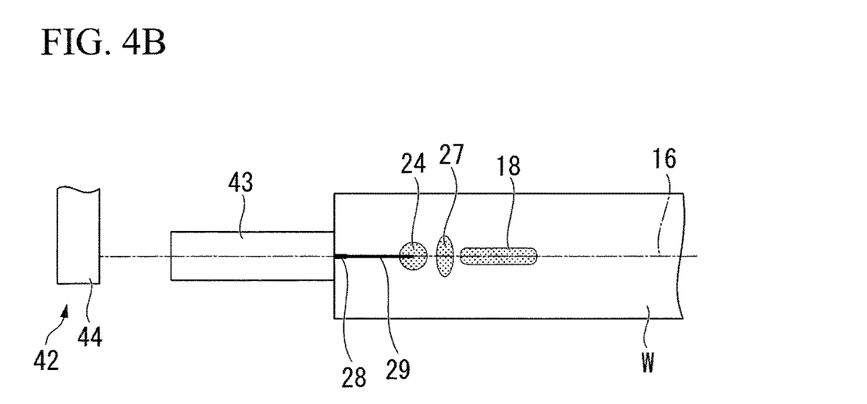
FIG. 4B is a plan view showing the schematic configuration of the second embodiment of the cutting device of the present invention.

Next, a second embodiment of the cutting device of the present invention will be described in detail with reference to the accompanying drawings. FIGS. 4A and 4B are schematic configuration views showing the second embodiment of the cutting device of the present invention, FIG. 4A is a side view, and FIG. 4B is a plan view. Further, in the following description of the second embodiment, elements that are the same as those of the first embodiment are designated by the same reference numerals, and description thereof will be omitted.

A cutting device 40 of the embodiment shown in FIGS. 4A and 4B is mainly distinguished from the cutting device 1 of the first embodiment shown in FIGS. 1A and 1B in that the cutting device is a placing type on which the workpiece W is placed and held, instead of the floating type in which a machining table 41 floats the workpiece W, and as the placing type is employed, the machining table 41 is configured to move in a state in which the workpiece W is placed on the machining table 41.

That is, the cutting device 40 of the embodiment includes the machining table 41 on which the workpiece W having a plate shape is placed, the laser radiation unit 3 configured to radiate a laser beam onto the workpiece W, the coolant injection unit 4 configured to inject a coolant onto the workpiece W, and a moving device 42 configured to relatively move the machining table 41.

Since the machining table 41 has a table shape having an upper surface on which the workpiece W is placed and held, the machining table 41 is movably disposed in a direction preset by the moving device 42 (an arrow direction of FIG. 4A). The machining table 41 includes a scattering member 43 extending forward from a front end of the machining table 41 (forward in the moving direction of the machining table 41). The scattering member 43 will be described below. In addition, since the machining table 41 narrows an installation area of the cutting device 40, reduces the weight of the machining table 4, and suppresses cost of the machining table 41, the machining table 41 is formed to substantially the same size (length) as the workpiece W.

Accordingly, when the workpiece W is placed on the machining table 41, as shown in FIGS. 4A and 4B, the front end of the workpiece W is disposed to be matched with the front end of the machining table 41.

The moving device 42 includes a driving unit 44 having a driving source such as a motor or the like disposed in front of the machining table 41, and a connecting member (not shown) configured to connect the driving unit 44 and the machining table 41, pulls the machining table 41 via the connecting member by driving of the driving unit 44, and moves the machining table 41 in an arrow direction (forward) of FIG. 4A. The above-mentioned moving device 42 straightly moves the workpiece W placed on the machining table 41 at a predetermined speed (for example, 1 m/s) along with the machining table 41.

All of the laser radiation unit 3, the coolant injection unit 4, the baffle 25 and the gas injection nozzle 26 have the same configuration as in the first embodiment, and are disposed to be fixed in the same manner as in the first embodiment. However, in the first embodiment, since the machining table 41 is also fixed, positional relations between the laser radiation unit 3, the coolant injection unit 4, the baffle 25, the gas injection nozzle 26 and the machining table 41 do not vary, whereas, in this embodiment, since the machining table 41 moves, a positional relations vary not only between the laser radiation unit 3, the coolant injection unit 4, the baffle 25, the gas injection nozzle 26 and the workpiece W but also between the laser radiation unit 3, the coolant injection unit 4, the baffle 25, the gas injection nozzle 26 and the machining table 41.

Figure 5:
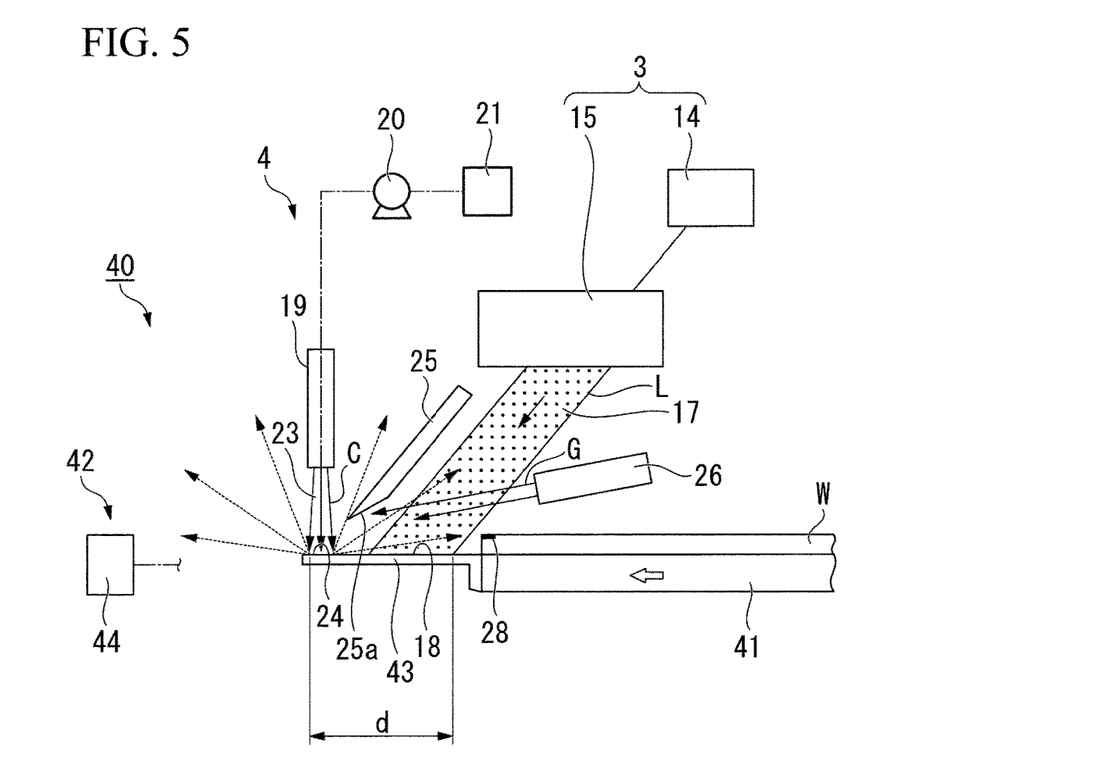
FIG. 5 is a side view for describing a pre-process of the cutting device shown in FIGS. 4A and 4B.

As shown in FIG. 4B, since the scattering member 43 has a long and thin plate shape and is formed of metal or ceramics attached to the front end of the machining table 41, like the first embodiment, the scattering member 43 is disposed on the projected cutting line 16 of the workpiece W. The upper surface of the scattering member 43 is also disposed to be flush with the upper surface of the machining table 41. When the above-mentioned scattering member 43 is disposed immediately under the injection nozzle 19 of the coolant injection unit 4 along with movement of the machining table 41, as shown in FIG. 5, the coolant C is injected to the upper surface from the injection nozzle 19. That is, the cooling area 24 is formed. In addition, the heating area 18 and a gas injection area (not shown) are also formed on the upper surface of the scattering member 43.

As shown in FIG. 5, a length of the scattering member 43 (a length in the moving direction of the machining table 41) is formed to be larger than a distance d between the front end in the moving direction of the machining table 41 of the cooling area 24 and the rear end in the moving direction of the machining table 41 of the heating area 18. Accordingly, the pre-process before the initial period machining is performed on the workpiece W can be performed only on the scattering member 43, and the pre-process can be stably performed.

When the workpiece W is cut by the above-mentioned cutting device 40, first, the workpiece W is disposed at a predetermined position on the machining table 41 by a conveyance apparatus (not shown). Here, as shown in FIGS. 4A and 4B, the front end of the workpiece W is disposed to match with the front end of the machining table 41.

Next, like the first embodiment, the initial crack 28 serving as a cutting start point is formed on the surface of the front end section of the workpiece W using a diamond cutter (not shown) or the like. Further, even formation of the initial crack 28 is also previously performed using a separate apparatus or the like before the workpiece W is set on the machining table 41, and then the workpiece W having the initial crack 28 may be disposed on the machining table 41.

Next, without moving the machining table 41, in a state in which the machining table 41 or the scattering member 43 is not disposed at the downward side of the laser radiation unit 3, the coolant injection unit 4 and the gas injection nozzle 26, these are respectively operated in the pre-process. Then, when the respective operations of the laser radiation unit 3, the coolant injection unit 4 and the gas injection nozzle 26 are stabilized, the machining table 41 is moved (advanced) by the moving device 42, and as shown in FIG. 5, the scattering member 43 is moved immediately under the laser radiation unit 3, the coolant injection unit 4 and the gas injection nozzle 26.

When the machining table 41 is moved in this way, in the front end section of the scattering member 43 in the moving direction of the scattering member 43, as injection of the coolant C from the injection nozzle 19 is received and the coolant C is rebounds from the upper surface of the scattering member 43, the spray or mist of the coolant C is scattered. Further, a place in which the injection of the coolant C is received becomes the cooling area 24. In addition, the rear end section of the scattering member 43 in the moving direction of the scattering member 43 is irradiated with the laser beam L from the laser radiation unit 3 to be heated. A place in which the radiation of the laser beam L is received becomes the heating area 18.

In the above-mentioned pre-process, as the scattering member 43 receives the injection of the coolant C from the injection nozzle 19, the spray or mist of the coolant C is scattered, and some of the spray or mist of the coolant C passes through the lower side of the baffle 25 to be scattered to the laser beam passage region 17. Accordingly, intensity of heating by the laser radiation unit 3 (intensity of heating by radiation of the laser beam L) is slightly reduced in comparison with the case in which no spray or mist of the coolant C is scattered.

After the above-mentioned pre-process, in a machining process (a scribing process), the machining table 41 is moved (advanced) by the moving device 42 while the laser radiation unit 3, the coolant injection unit 4 and the gas injection nozzle 26 are each operated, and the front end section of the workpiece W having the initial crack 28 on the machining table 41 arrives at the downward side of the laser beam passage region 17. Accordingly, the heating area 18 is formed on the workpiece W, and the front end section of the workpiece W is irradiated with the laser beam L to be heat-treated. Here, since the front end section of the workpiece W does not arrive at the coolant passage region 23, the initial period machining in which only the heating treatment is received is performed without receiving the cooling treatment.

In the above-mentioned initial period machining time, while the coolant injection unit 4 does not perform the cooling treatment on the workpiece W, in order to maintain continuity and uniformity of the machining conditions, injection of the coolant C is performed as described above. Accordingly, even in the embodiment, as a portion of the spray or mist generated due to rebounding of the coolant C from the scattering member 43 is scattered to the laser beam passage region 17 as described above, intensity of heating by radiation of the laser beam L is slightly reduced.

Meanwhile, when the scattering member 43 is not provided, since the coolant C does not rebound like the first embodiment, a decrease in heating intensity does not occur.

Next, in the middle period machining continuing from the initial period machining, the laser radiation unit 3, the coolant injection unit 4 and the gas injection nozzle 26 are each operated, as shown in FIGS. 4A and 4B, the workpiece W is continuously moved (advanced) by the moving device 42, the front end section of the workpiece W having the initial crack 28 arrives at the downward side of the coolant passage region 23, and a portion slightly closer to the rear end than the front end section of the workpiece W arrives at the downward side of the laser beam passage region 17. Further, even in this embodiment, during a transition from the initial period machining to the middle period machining, the workpiece W is moved at a constant speed by the moving device 42 without stoppage of the workpiece W.

When the coolant C is injected to cool the front end section of the workpiece W in this way, a previously heated portion is abruptly cooled. Then, tensile stress is generated in the surface (the upper surface) of the workpiece W in the heating/cooling operation, and stress concentration is generated in the notch root of the initial crack 28. For this reason, when a predetermined stress is applied, as shown in FIG. 4B, the cutting line 29 advances along the projected cutting line 16 from the initial crack 28 serving as a starting point.

Accordingly, by controlling the direction in which the crack advances, the cutting line 29 having one stripe shape (groove shape) is ultimately formed on the projected cutting line 16 of the workpiece W. That is, as the workpiece W is continuously moved at a constant speed while the laser radiation unit 3, the coolant injection unit 4 and the gas injection nozzle 26 are each operated, the cutting line 29 is formed in the moving direction of the workpiece W (the machining table 41).

Further, in the above-mentioned machining, like the first embodiment, the baffle 25 is installed and the air (the gas) G is injected from the gas injection nozzle 26 toward the gap between the baffle 25 and the workpiece W. Accordingly, the scattering of the coolant C injected from the coolant injection unit 4 to the laser beam passage region 17 can be suppressed to a minimum level. However, the scattering of the coolant C to the laser beam passage region 17 cannot be completely removed. That is, even when a slight amount of scattering is performed, in the laser radiation unit 3, intensity of heating by radiation of the laser beam L is decreased by the scattering of the coolant C.

When such machining (scribing process) is terminated, as the bending machining is performed on the cutting line 29 of the workpiece W by the bending machine (not shown), the workpiece W is cut along the cutting line 29 as a boundary. In addition, when a plate thickness of the workpiece W is extremely small (for example, about 0.1 mm), a condition in which cutting can be performed at a cooled point (full cutting) can be made without performing the bending machining.

In the cutting device 40 of the embodiment, the scattering member 43, which extends forward from the front end of the machining table 41 in the moving direction of the machining table 41 (forward in the moving direction from the machining table 41) and is configured to receive injection of the coolant C from the coolant injection unit 4 to scatter the coolant C, is installed. For this reason, even in the initial period machining time in which the front end section of the workpiece W arrives at the downward side of the laser radiation unit 3 and only the heating treatment by radiation of the laser beam is performed on the workpiece W, the coolant C injected from the coolant injection unit 4 rebounds from (is scattered by) the scattering member 43 and is scattered into the laser beam passage region 17.

Accordingly, as shown in FIGS. 4A and 4B, as the front end section of the workpiece W arrives at the downward side of the coolant injection unit 4, in and after the middle period machining time in which the cooling by the coolant injection and the heating by the laser beam radiation are simultaneously performed in different regions of the workpiece W, conditions which are substantially the same as when the coolant C scattered by the workpiece W in the initial period machining time is obtained.

That is, since the coolant C is scattered in the laser beam passage region 17 both in the initial period machining time and in and after the middle period machining time shown in FIG. 4A, an influence applied to the laser beam passage region 17 by the coolant C is substantially equal from the initial period machining time until after the middle period machining time. Accordingly, the heating condition by the laser beam radiation can be substantially managed (within a predetermined range) from the initial period machining time until after the middle period machining time. Accordingly, desired cutting precision can be obtained.

Meanwhile, in the initial period machining time when the scattering member 43 is not installed, the coolant C is injected to the forward sides of the machining table 41 and the workpiece W situated on the machining table 4, and the coolant C flows toward the downward side of the machining table 41. As a result, the coolant C does not rebound toward the upward side of the machining table 41, and the spray or mist of the coolant C is not scattered to the laser beam passage region 17 either. For this reason, intensity of heating by the laser radiation unit 3 (intensity of heating by radiation of the laser beam L) is increased to be larger than in and after the middle period machining time shown in FIG. 4A. That is, the heating condition (heating intensity) by the laser beam radiation varies from the initial period machining time until after the middle period machining time, and the heating condition (heating intensity) cannot be managed within a predetermined range. Accordingly, desired cutting precision cannot be obtained.

Further, the present invention is not limited to the above-mentioned first embodiment and second embodiment but various modifications may be made without departing from the scope of the present invention.

For example, in the first embodiment, while the workpiece W is moved with respect to the laser radiation unit 3 and the coolant injection unit 4 by the moving device 5, the workpiece W may be fixed and the machining table 2, and the laser radiation unit 3 or the coolant injection unit 4 may be moved with respect to the fixed workpiece W. Similarly, even in the second embodiment, while the machining table 41 is moved with respect to the laser radiation unit 3 and the coolant injection unit 4 by the moving device 42, the machining table 41 may be fixed and the laser radiation unit 3 and the coolant injection unit 4 may be moved with respect to the fixed machining table 41.

In addition, in the first embodiment and the second embodiment, while the baffle 25 and the gas injection nozzle 26 are separately disposed, the gas injection nozzle 26 may be built in the baffle 25.

Further, in the first embodiment and the second embodiment, while the shielding body according to the present invention has been formed by the baffle 25 having the flat plate shape, the shape of the baffle 25 is not limited to the flat plate shape but various shapes can be employed as long as the baffle 25 serving as the shielding body is disposed between the laser beam passage region 17 and the coolant passage region 23, the coolant C injected by the coolant injection unit 4 rebounds and the spray or mist of the coolant C can be suppressed from being scattered in the laser beam passage region 17.

For example, a shielding hood serving as the shielding body having substantially a box shape with no bottom and disposed to surround the coolant passage region 23 may be used.

In addition, in the first embodiment and the second embodiment, while the injection nozzle 19 that constitutes the coolant injection unit 4 is disposed to stand up in the vertical direction and the coolant C from the injection nozzle 19 is injected toward the downward side in the vertical direction, as the injection nozzle 19 is inclined with respect to the cooling area 24, the coolant C may be injected in an inclined manner. In this case, the front end of the injection nozzle 19 may be inclined in a direction away from the laser beam passage region 17, and may be set to an injection direction in which the coolant C is injected in a direction away from the laser beam passage region 17 in an inclined manner. Accordingly, the spray or mist of the coolant C can be suppressed from being scattered in the laser beam passage region 17.

INDUSTRIAL APPLICABILITY

According to the cutting device of the present invention, the heating condition of the laser beam radiation can be managed to be substantially equal (within a predetermined range) from the initial period machining time until after the middle period machining time. Accordingly, desired cutting precision can be obtained.

REFERENCE SIGNS LIST 1, 40 cutting device
2, 41 machining table
3 laser radiation unit
4 coolant injection unit
5, 42 moving device
11 floating plate
12 clamp member
17 laser beam passage region
18 heating area
19 injection nozzle
22, 43 scattering member
24 cooling area
25 baffle (shielding body)
26 gas injection nozzle
27 gas injection area
W workpiece
L laser beam
C coolant
G air (gas)

The invention claimed is:

1. A cutting device comprising:
a machining table which floats a workpiece having a plate shape;
a laser radiator positioned to radiate a laser beam onto the workpiece;
a coolant injector positioned to inject a coolant onto the workpiece; and
an actuator that relatively moves the workpiece with respect to the laser radiator and the coolant injector in a preset direction,
wherein the cutting device is configured to relatively move the workpiece in a direction preset by the actuator while radiating a laser beam from the laser radiator to a heating area set on the workpiece to heat the heating area, and to inject the coolant from the coolant injector to a cooling area set on the heated heating area to cool the cooling area, and
a plate member arranged to receive injection of the coolant from the coolant injector and scatter the coolant, wherein the plate member is installed at the machining table in front of the workpiece in a moving direction in which the workpiece relatively moves, and
wherein a baffle is positioned to provide a gap between the baffle and an upper surface of the workpiece, and wherein the baffle is positioned between a laser beam passage region and a coolant passage region, wherein the laser beam passage region is a region in which the laser beam radiated from the laser radiator passes between the laser radiator and the heating area, and wherein the coolant passage region is a region in which the coolant injected from the coolant injector passes between the coolant injector and the cooling area, and
a gas injector positioned to inject a gas from the laser beam passage region side toward the gap between the baffle and the workpiece.

2. The cutting device according to claim 1, wherein the machining table comprises a plurality of floating plates arranged in parallel at an interval in a direction perpendicular to a direction in which the workpiece is relatively moved by the actuator,
the actuator comprises a clamp member which travels in a lengthwise direction of the interval while sandwiching a front end section of the workpiece, and
the plate member is disposed in the interval.

3. The cutting device according to claim 2, wherein a plurality of clamp members are installed, and the clamp members sandwich the workpiece at different positions in a widthwise direction of the front end section of the workpiece.

4. A cutting device comprising:
a machining table which holds a workpiece having a plate shape;
a laser radiator positioned to radiate a laser beam onto the workpiece;
a coolant injector positioned to inject a coolant onto the workpiece; and
an actuator that relatively moves the machining table with respect to the laser radiator and the coolant injector in a preset direction,
wherein the cutting device is configured to relatively move the workpiece in a direction preset by the actuator by relatively moving the machining table in the preset direction while radiating a laser beam from the laser radiator to a heating area set on the workpiece to heat the heating area, and to inject the coolant from the coolant injector to a cooling area set on the heated beating area to cool the cooling area, and
a plate member extending forward in a moving direction from a front end of the machining table in the moving direction in which the machining table is relatively moved, and wherein the plate member is arranged to receive injection of the coolant from the coolant injector to scatter the coolant, and
wherein a baffle is positioned to provide a gap between the baffle and an upper surface of the workpiece, and wherein the baffle is positioned between a laser beam passage region and a coolant passage region, wherein the laser beam passage region is a region in which the laser beam radiated from the laser radiator passes between the laser radiator and the heating area, and wherein the coolant passage region is a region in which the coolant injected from the coolant injector passes between the coolant injector and the cooling area, and
a gas injector positioned to inject a gas from the laser beam passage region side toward the gap between the baffle and the workpiece.

5. The cutting device according to claim 1, wherein a length of the plate member in a direction in which the workpiece is relatively moved by the actuator is larger than a distance between a front end in the relative moving direction of the cooling area and a rear end in the relative moving direction of the heating area.

6. A cutting device comprising:
a machining table which floats a workpiece having a plate shape;
a laser radiator configured positioned to radiate a laser beam onto the workpiece;
a coolant injector positioned to inject a coolant onto the workpiece; and
an actuator that relatively moves the workpiece with respect to the laser radiator and the coolant injector in a preset direction,
wherein the cutting device is configured to relatively move the workpiece in a direction preset by the actuator while radiating a laser beam from the laser radiator to a heating area set on the workpiece to heat the heating area, and to inject the coolant from the coolant injector to a cooling area set on the heated heating area to cool the cooling area,
a plate member arranged to receive injection of the coolant from the coolant injector and scatter the coolant, wherein the plate member is installed at the machining table in front of the workpiece in a moving direction in which the workpiece relatively moves,
the machining table comprises a plurality of floating plates arranged in parallel at an interval in a direction perpendicular to a direction in which the workpiece is relatively moved by the actuator,
the actuator comprises a clamp member which travels in a lengthwise direction of the interval while sandwiching a front end section of the workpiece, and
the plate member is disposed in the interval,
a baffle positioned to provide a gap between the baffle and an upper surface of the workpiece, wherein the baffle is positioned between a laser beam passage region and a coolant passage region, wherein the laser beam passage region is a region in which the laser beam radiated from the laser radiator passes between the laser radiator and the heating area, and wherein the coolant passage region is a region in which the coolant injected from the coolant injector passes between the coolant injector and the cooling area, and a gas injector configured to inject a gas from the laser beam passage region side toward the gap between the baffle and the workpiece.

7. A cutting device comprising:

a machining table which floats a workpiece having a plate shape;

a laser radiator positioned to radiate a laser beam onto the workpiece;

a coolant injector positioned to inject a coolant onto the workpiece; and an actuator that relatively moves the workpiece with respect to the laser radiator and the coolant injector in a preset direction, wherein the cutting device is configured to relatively move the workpiece in a direction preset by the actuator while radiating a laser beam from the laser radiator to a heating area set on the workpiece to heat the heating area, and inject the coolant from the coolant injector to a cooling area set on the heated heating area to cool the cooling area, a plate member arranged to receive injection of the coolant from the coolant injector and scatter the coolant, wherein the plate member is installed at the machining table in front of the workpiece in a moving direction in which the workpiece relatively moves, the machining table comprises a plurality of floating plates arranged in parallel at an interval in a direction perpendicular to a direction in which the workpiece is relatively moved by the actuator, the actuator comprises a clamp member which travels in a lengthwise direction of the interval while sandwiching a front end section of the workpiece, and the plate member is disposed in the interval, a plurality of clamp members are installed, and the clamp members sandwich the workpiece at different positions in a widthwise direction of the front end section of the workpiece, a baffle positioned to provide a gap between the baffle and an upper surface of the workpiece, wherein the baffle is positioned between a laser beam passage region and a coolant passage region, wherein the laser beam passage region is a region in which the laser beam radiated from the laser radiator passes between the laser radiator and the heating area, and wherein the coolant passage region is a region in which the coolant injected from the coolant injector passes between the coolant injector and the cooling area, and a gas injector positioned to inject a gas from the laser beam passage region side toward the gap between the baffle and the workpiece.

8. A cutting device comprising:

a machining table that floats a workpiece having a plate shape;

a laser radiator positioned to radiate a laser beam onto the workpiece;

a coolant injector positioned to inject a coolant onto the workpiece; and an actuator configured to relatively move the workpiece with respect to the laser radiator and the coolant injector in a preset direction, wherein the cutting device is configured to relatively move the workpiece in a direction preset by the actuator while radiating a laser beam from the laser radiator to a heating area set on the workpiece to heat the heating area, and inject the coolant from the coolant injector to a cooling area set on the heated heating area to cool the cooling area, a plate member arranged to receive injection of the coolant from the coolant injector and scatter the coolant, wherein the plate member is installed at the machining table in front of the workpiece in a moving direction in which the workpiece relatively moves, a length of the plate member in a direction in which the workpiece is relatively moved by the actuator is larger than a distance between a front end in the relative moving direction of the cooling area and a rear end in the relative moving direction of the heating area, a baffle positioned to provide a gap between the baffle and an upper surface of the workpiece, wherein the baffle is positioned between a laser beam passage region and a coolant passage region, wherein the laser beam passage region is a region in which the laser beam radiated from the laser radiator passes between the laser radiator and the heating area, and wherein the coolant passage region is a region in which the coolant injected from the coolant injector passes between the coolant injector and the cooling area, and a gas injector positioned to inject a gas from the laser beam passage region side toward the gap between the baffle and the workpiece.

* * * * *